(12) United States Patent
Nagata

(10) Patent No.: US 12,738,608 B2
(45) Date of Patent: Sep. 15, 2026

(54) SECONDARY BATTERY

(71) Applicant: TOYOTA JIDOSHA KABUSHIKI KAISHA, Toyota (JP)

(72) Inventor: Yuka Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 638 days.

(21) Appl. No.: 17/970,253

(22) Filed: Oct. 20, 2022

(65) Prior Publication Data

US 2023/0143046 A1 May 11, 2023

(30) Foreign Application Priority Data

Nov. 11, 2021 (JP) ................................ 2021-183785

(51) Int. Cl.
*H01M 50/547* (2021.01)
*H01M 50/103* (2021.01)
*H01M 50/121* (2021.01)

(52) U.S. Cl.
CPC ....... *H01M 50/547* (2021.01); *H01M 50/103* (2021.01); *H01M 50/121* (2021.01)

(58) Field of Classification Search
CPC .................................................. H01M 50/547
See application file for complete search history.

(56) References Cited

U.S. PATENT DOCUMENTS

2014/0170467 A1* 6/2014 Kwon ................. H01M 50/176 429/152
2016/0099447 A1* 4/2016 Takada ................ H01M 50/105 429/211

FOREIGN PATENT DOCUMENTS

| | | | |
|---|---|---|---|
| JP | H11-7983 | A | 1/1999 |
| JP | 2005-056815 | A | 3/2005 |
| JP | 2012-018795 | A | 1/2012 |
| JP | 6037589 | B2 | 12/2016 |
| JP | 2017-069207 | A | 4/2017 |
| KR | 10-2014-0077622 | A | 6/2014 |
| WO | 2019/186932 | A1 | 10/2019 |

OTHER PUBLICATIONS

KR101111074B1and Translation (Year: 2012).*

* cited by examiner

*Primary Examiner* — Brian R Ohara
(74) *Attorney, Agent, or Firm* — Dinsmore & Shohl LLP

(57) ABSTRACT

Provided is a secondary battery having a structure that can reduce a space for the secondary battery. The secondary battery includes: exterior bodies that look a quadrilateral as a whole in a plan view; an electrode body that is housed in the exterior bodies; cutout parts at respective two sides among the sides of the quadrilateral, the two sides being opposite to each other; a cathode terminal disposed in one of the cutout parts; and an anode terminal disposed in another one of the cutout parts.

2 Claims, 8 Drawing Sheets

Secondary battery

Electrode terminal

Electrode terminal

SECONDARY BATTERY

CROSS-REFERENCE TO RELATED APPLICATIONS

This application is based upon and claims the benefit of priority of the prior Japanese Patent Application No. 2021-183785, filed on Nov. 11, 2021, the entire contents of which are incorporated herein by reference.

FIELD

The present disclosure relates to a secondary battery.

BACKGROUND

Patent Literature 1 discloses a secondary battery comprising a rectangular exterior body in a plan view, an electrode body housed in the exterior body, and a cathode terminal and an anode terminal that are at one or respective two sides of the exterior body, wherein the respective two sides are opposite to each other.

CITATION LIST

Patent Literature

Patent Literature 1: JP 2005-56815 A

SUMMARY

Technical Problem

When plural secondary batteries are stacked and each terminal thereof is connected, the connection is that the terminals protruding from a rectangular exterior body in a plan view are connected to each other as in Patent Literature 1 to form a wasted space. Thus, improvement in structural efficiency (reduction of the space for the secondary batteries) is desired.

In view of the above problem, an object of the present disclosure is to provide a secondary battery having a structure that can reduce a space therefor.

Solution to Problem

As one measure to solve the above problem, the present application discloses a secondary battery comprising: exterior bodies that look a quadrilateral as a whole in a plan view; an electrode body that is housed in the exterior bodies; cutout parts at respective two sides among sides of the quadrilateral, the two sides being opposite to each other; a cathode terminal disposed in one of the cutout parts; and an anode terminal disposed in another one of the cutout parts.

The two cutout parts may be provided at respective corners of the quadrilateral, the corners being opposite to each other.

The electrode body, which is housed in the exterior bodies, may be also provided with cutout parts, at least part of each of the cutout parts a resin layer being placed.

Effects

The secondary battery according to the present disclosure can suppress generation of a wasted space due to protrusion of electrode terminals, and can reduce a space for the secondary battery.

BRIEF DESCRIPTION OF DRAWINGS

FIG. 4 is an external perspective view of an electrode body A;

FIG. 8 illustrates a conventional secondary battery.

DESCRIPTION OF EMBODIMENTS

The present disclosure will be hereinafter described using embodiments. Here, the embodiments to be described are examples. The present disclosure is not limited to these embodiments.

1. Secondary Battery

Figure 1:
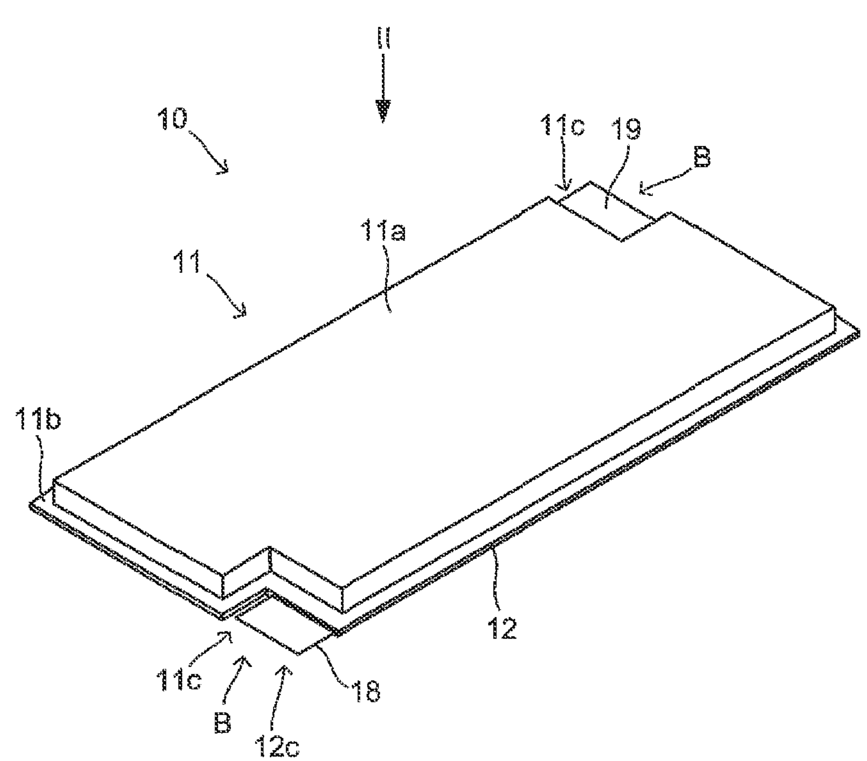
FIG. 1 is an external perspective view of a secondary battery 10.
Figure 2:
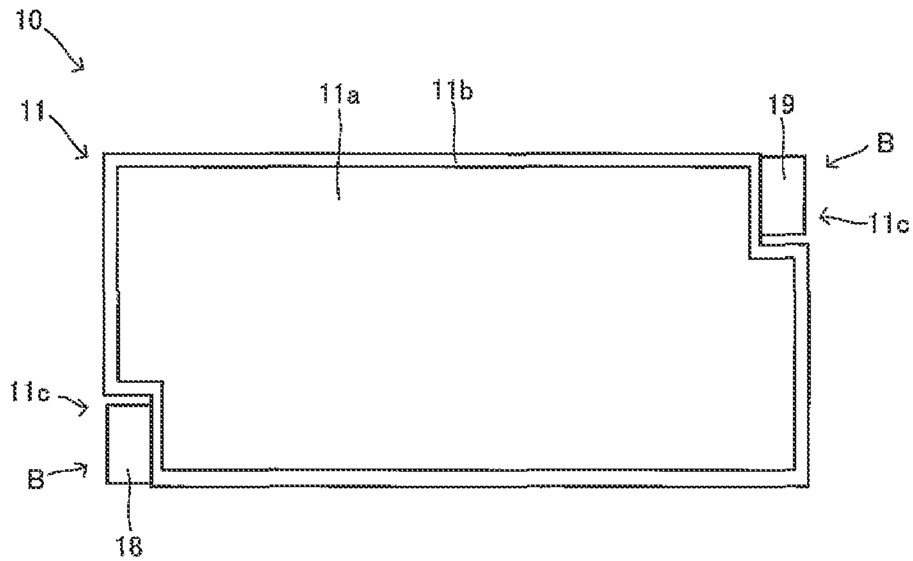
FIG. 2 is a plan view of the secondary battery 10.
Figure 3:
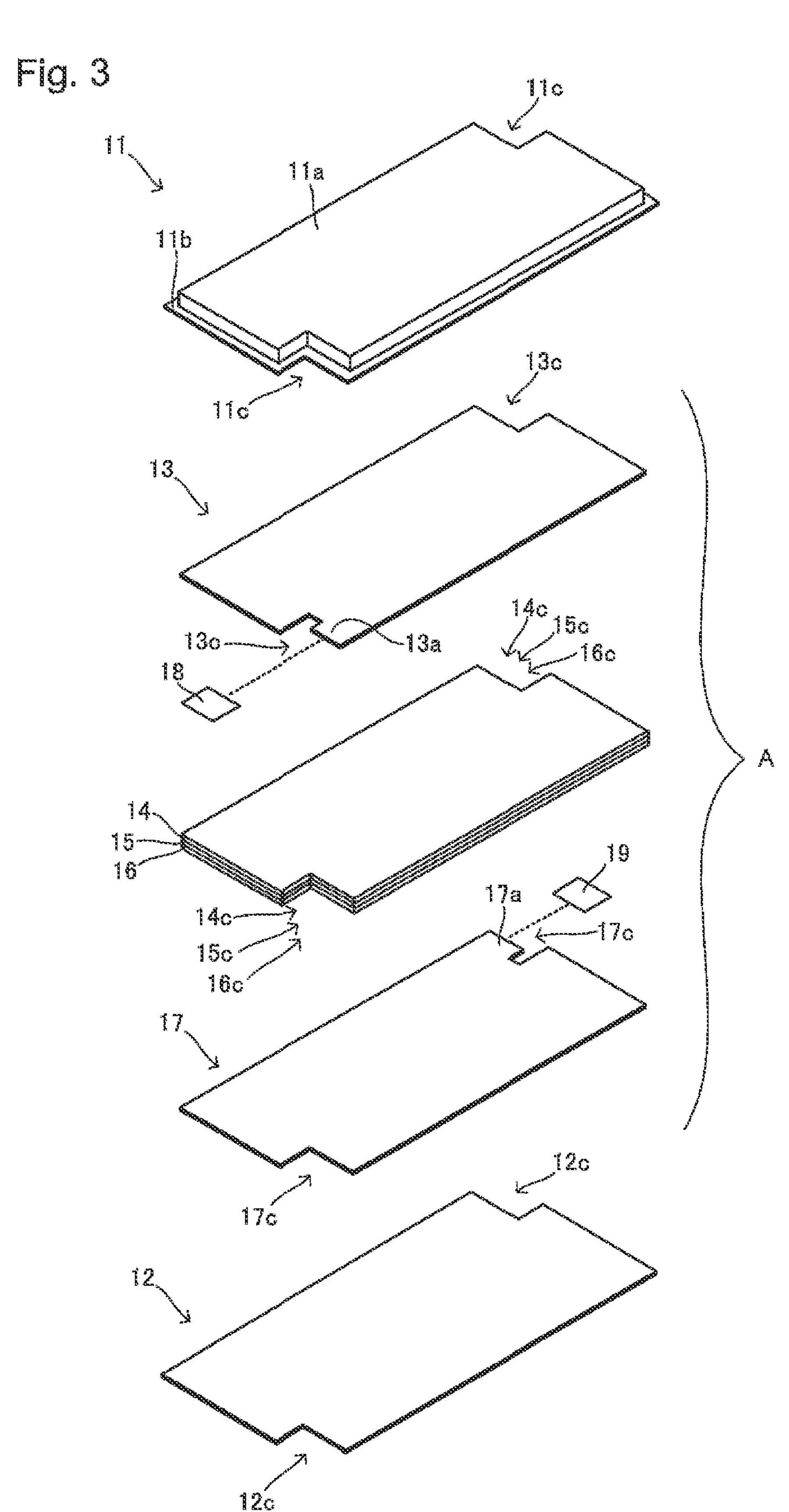
FIG. 3 is an exploded perspective view of the secondary battery 10.
Figure 4:
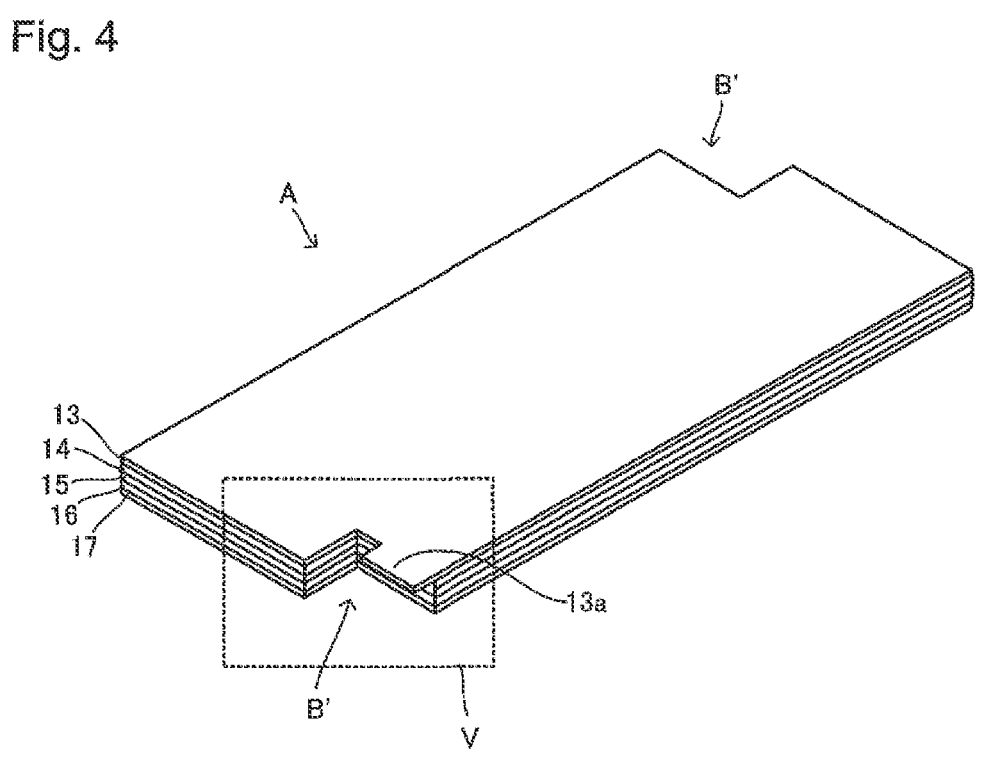
Figure 5:
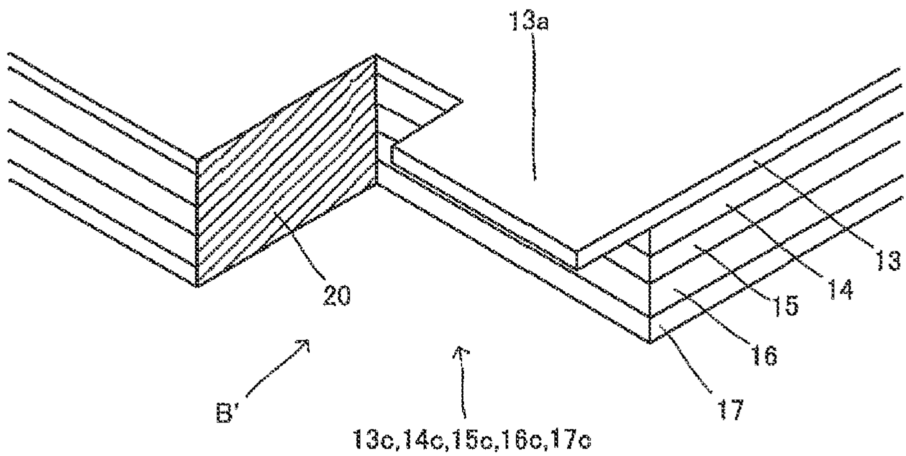
FIG. 5 focuses on a portion of a cutout part B' in FIG. 4.

FIGS. 1 to 5 illustrate a secondary battery 10 according to one embodiment. FIG. 1 is an external perspective view, FIG. 2 is a plan view (looking in the direction pointed by the arrow II in FIG. 1), FIG. 3 is an exploded perspective view, FIG. 4 is an external perspective view showing an electrode body A that is a layered body to be placed inside exterior bodies of the secondary battery 10, and FIG. 5 is an enlarged view focusing on a portion where a cutout part B' is formed in FIG. 4.

As seen from FIGS. 1 to 5, the secondary battery 10 according to the present embodiment is a quadrilateral as a whole in a plan view (from the viewpoint of FIG. 2) which is provided with cutout parts B at respective two corners that are opposite to each other. Here, "a quadrilateral as a whole" means that: it can be acknowledged that a quadrilateral would be formed if no cutout parts B were cut out; and the quadrilateral is not necessary to be a quadrilateral in a strict sense, but may have roughness with some necessary member and has a form that can be regarded as a quadrilateral as a whole.

The secondary battery 10 has a first exterior body 11, a second exterior body 12, a cathode current collector layer 13, a cathode active material layer 14, a separator layer 15, an anode active material layer 16, an anode current collector layer 17, a cathode terminal 18, and an anode terminal 19. The secondary battery 10 is formed by layering these layers. The secondary battery 10 is also provided with resin layers 20 (refer to FIG. 5). The structure of each member and the relationship thereof will be hereinafter described.

Here, a layered body portion formed by the cathode current collector layer 13, the cathode active material layer 14, the separator layer 15, the anode active material layer 16, and the anode current collector layer 17 may be expressed as "electrode body A".

1.1. First Exterior Body and Second Exterior Body

The first exterior body 11 and the second exterior body 12 are each a sheet member of an exterior material. The first exterior body 11 and the second exterior body 12 are each formed by joining circumferential end portions thereof as including the electrode body A, a part of the cathode terminal 18, and a part of the anode terminal 19 therebetween. Therefore, these exterior bodies form a bag. The electrode body A is included and sealed in these exterior bodies.

The first exterior body 11 has a depressed part 11*a* including an opening in one face thereof (the opening is invisible in FIG. 3 because being in the face on the bottom side in the sheet, and thus, entering a blind spot). The electrode body A is housed inside this depressed part 11*a*. The circumferential edge of the depressed part 11*a* is provided with a joined part 11*b*, so that the joined part 11*b* protrudes from the edge. This joined part 11*b* and a circumferential end portion of a face of the second exterior body 12 are joined to each other.

In the present embodiment, the first exterior body 11 is a quadrilateral as a whole in a plan view, and in order to form the cutout parts B, is provided with cutout parts 11*c* at respective two corners that are opposite to each other.

The second exterior body 12 is in the form of a sheet, and is a quadrilateral member as a whole in a plan view. In order to form the cutout parts B, the second exterior body 12 is also provided with cutout parts 12*c* at respective two corners that are opposite to each other.

As described above, the circumferential end portion of a face among the faces of the second exterior body 12 which faces the first exterior body 11 is superposed on and joined to the joined part 11*b* of the first exterior body 11.

In the present embodiment, the first exterior body 11 and the second exterior body 12 are each formed of a laminate sheet. Here, the laminate sheet is a sheet having a metal layer and a sealant layer. Examples of a metal etc. used for the laminate sheet include aluminum and stainless steel. Examples of the material used for the sealant layer include polypropylene, polyethylene, polystyrene and polyvinyl chloride which are thermoplastic resins.

The way of joining the first exterior body 11 and the second exterior body 12 to each other, that is, joining the laminate sheets is not particularly limited, but any known way may be used therefor. Specific examples of the way include: ways of welding (e.g., hot plate welding, ultrasonic welding, vibration welding, and laser welding) the sealant layers of the laminate sheets to each other; and adhering with an adhesive.

1.2. Cathode Current Collector Layer

The cathode current collector layer 13 is a layer included in the electrode body A, and is layered on the cathode active material layer 14 to collect a current from the cathode active material layer 14. The cathode current collector layer 13 is in the form of quadrilateral foil as a whole in a plan view, and in order to form the cutout parts B, is provided with cutout parts 13*c* at respective two corners that are opposite to each other.

A cathode tab 13*a* to which the cathode terminal 18 is to be connected is arranged inside one of the two cutout parts 13*c* of the cathode current collector layer 13. The cathode tab 13*a* is a part to electrically connect the cathode current collector layer 13 and the cathode terminal 18.

Examples of the material constituting the cathode current collector layer 13 include stainless steel, aluminum, nickel, iron, titanium, and carbon.

1.3. Cathode Active Material Layer

The cathode active material layer 14 is a layer included in the electrode body A. The cathode current collector layer 13 is layered on one face of the cathode active material layer 14; and the separator layer 15 is layered on the other face of the cathode active material layer 14. The cathode active material layer 14 is in the form of a quadrilateral sheet as a whole in a plan view, and in order to form the cutout parts B, is provided with cutout parts 14*c* at respective two corners that are opposite to each other.

The cathode active material layer 14 is a layer containing a cathode active material, and may further contain at least one of a solid electrolyte material, a conductive material, and a binder, if necessary.

Any known active material may be used as the cathode active material. Examples of the cathode active material include cobalt-based (such as $LiCoO_2$), nickel-based (such as $LiNiO_2$), manganese-based (such as $LiMn_2O_4$ and $Li_2Mn_2O_3$), iron phosphate-based (such as $LiFePO_4$ and $Li_2FeP_2O_7$), NCA-based (such as a compound of nickel, cobalt and aluminum), and NMC-based (such as a compound of nickel, manganese and cobalt) active materials, and a more specific example thereof is $LiNi_{1/3}Co_{1/3}Mn_{1/3}O_2$.

The surface of the cathode active material may be coated with an oxide layer such as a lithium niobate layer, a lithium titanate layer and a lithium phosphate layer.

In some embodiments, the solid electrolyte is an inorganic solid electrolyte because the inorganic solid electrolyte has high ionic conductivity and heat resistance, compared with the organic polymer electrolyte. Examples of the inorganic solid electrolyte include sulfide solid electrolytes and oxide solid electrolytes.

Examples of sulfide solid electrolyte materials having Li-ion conductivity include $Li_2S—P_2S_5$, $Li_2S—P_2S_5—LiI$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5$-ZmSn (m and n are positive numbers, and Z is any of Ge, Zn and Ga), $Li_2S—GeS_2$, $Li_2S—SiS_2—Li_3PO_4$ and $Li_2S—SiS_2$-$Li_xMO_y$ (x and y are positive numbers, and M is any of P, Si, Ge, B, Al, Ga and In). The expression "$Li_2S—P_2S_5$" means any sulfide solid electrolyte material made with a raw material composition containing $Li_2S$ and $P_2S_5$. The same is applied to the other expressions.

Examples of oxide solid electrolyte materials having Li-ion conductivity include compounds having a NASICON-type structure. Examples of compounds having a NASICON-type structure include compounds represented by the general formula $Li_{1+x}Al_xGe_{2-x}(PO_4)_3$ ($0 \le x \le 2$) (LAGP), and compounds represented by the general formula $Li_{1+x}Al_xTi_{2-x}(PO_4)_3$ ($0 \le x \le 2$) (LATP). Other examples of the oxide solid electrolyte materials include LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$).

The binder is not particularly limited as long as being chemically and electrically stable. Examples of the binder include fluorine-based binders such as polyvinylidene fluoride (PVDF) and polytetrafluoroethylene (PTFE), rubber-based binders such as styrene-butadiene rubber (SBR), olefinic binders such as polypropylene (PP) and polyethylene (PE), and cellulose-based binders such as carboxymethyl cellulose (CMC).

As the conductive material, a carbon material such as acetylene black (AB), Ketjen black, or carbon fiber, or a metal material such as nickel, aluminum and stainless steel may be used.

The content of each component in the cathode active material layer 14 may be the same as a conventional one. In some embodiments, the cathode active material layer 14 has a thickness of, for example, 0.1 μm to 1 mm, or a thickness of 1 μm to 150 μm.

1.4. Separator Layer

The separator layer (solid electrolyte layer) 15 is a layer formed by containing a solid electrolyte material as being placed between the cathode active material layer 14 and the anode active material layer 16. The separator layer 15 contains at least a solid electrolyte material. The solid electrolyte material may be considered in the same manner as that described for the cathode active material layer 14.

The separator layer 15 is a layer included in the electrode body A, is in the form of a quadrilateral sheet as a whole in a plan view, and in order to form the cutout parts B, is provided with cutout parts 15*c* at respective two corners that are opposite to each other.

1.5. Anode Active Material Layer

The anode active material layer 16 is a layer included in the electrode body A and containing at least an anode active material. The anode active material layer 16 may contain a binder, a conductive material, and a solid electrolyte material, if necessary. The binder, the conductive material, and the solid electrolyte material may be considered in the same manner as those for the cathode active material layer 14.

The anode active material is not particularly limited. When a lithium ion battery is formed, examples of the anode active material include carbon materials such as graphite and hard carbon, various oxides such as lithium titanate, Si and Si alloys, and metallic lithium and lithium alloys.

The anode active material layer 16 is in the form of a quadrilateral sheet as a whole in a plan view. The separator layer 15 is layered on one face of the anode active material layer 16; and the anode current collector layer 17 is layered on the other face of the anode active material layer 16. In order to form the cutout parts B, the anode active material layer 16 is provided with cutout parts 16*c* at respective two corners that are opposite to each other.

The content of each component in the anode active material layer 16 may be the same as a conventional one. In some embodiments, the anode active material layer 16 has a thickness of, for example, 0.1 μm to 1 mm, or a thickness of 1 μm to 150 μm.

1.6. Anode Current Collector Layer

The anode current collector layer 17 is a layer included in the electrode body A, and is layered on the anode active material layer 16 to collect a current from the anode active material layer 16. The anode current collector layer 17 is in the form of quadrilateral foil as a whole in a plan view, and in order to form the cutout parts B, is provided with cutout parts 17*c* at respective two corners that are opposite to each other.

An anode tab 17*a* to which the anode terminal 19 is to be connected is arranged inside one of the two cutout parts 17*c* of the anode current collector layer 17. The anode tab 17*a* is a part to electrically connect the anode current collector layer 17 and the anode terminal 19. Here, as seen from FIGS. 1 to 3, in the electrode body A, the anode tab 17*a* is arranged in the cutout part B on the opposite side of the cutout part B where the cathode tab 13*a* of the cathode current collector layer 13 is arranged, among the two cutout parts 17*c*.

Examples of the material constituting the anode current collector layer 17 include stainless steel, copper, nickel, and carbon.

1.7. Cathode Terminal and Anode Terminal

The cathode terminal 18 and the anode terminal 19 are electroconductive members, and are to be terminals for electrically connecting respective electrodes to the outside.

Therefore, one end of the cathode terminal 18 is electrically connected to the cathode tab 13*a*, and the other end thereof penetrates a joined portion of the first exterior body 11 and the second exterior body 12 to be exposed to the outside. At this time, the cathode terminal 18 is placed in one of the two cutout parts B of the secondary battery 10.

One end of the anode terminal 19 is electrically connected to the anode tab 17*a*, and the other end thereof penetrates a joined portion of the first exterior body 11 and the second exterior body 12 to be exposed to the outside. At this time, the anode terminal 19 is placed in the other one of the two cutout parts B of the secondary battery 10, where the cathode terminal 18 is not placed.

1.8. Resin Layers

As shown in FIG. 5, the resin layer 20 is a resin layer layered on a face that appeared in each of the cutout parts B' formed by layering the cutout parts (13*c*, 14*c*, 15*c*, 16*c*, 17*c*) provided in the respective layers in the electrode body A. This resin layer 20 can prevent short-circuiting. Accordingly, an electrical insulating material may be applied as the material constituting the resin layer 20, and examples thereof include urethane acrylate resins, epoxy resins, and olefin resins. Any of various curable resins or any of various thermoplastic resins can be used. The curable resin may be a thermosetting resin, a photocurable resin (e.g., UV curable resin) or an electron beam curable resin. The resin layer may be formed from one or plural resin(s).

The area the placed resin layer 20 has is not particularly limited. The resin layer 20 may be placed only on part of the face that appeared in the cutout part B', or may be placed on the entire face, as long as short-circuiting can be prevented. The resin layer 20 like this can be formed by applying, onto the face, a resin before curing, and curing the resin by an appropriate way.

1.9. Another Embodiment

Figure 6:
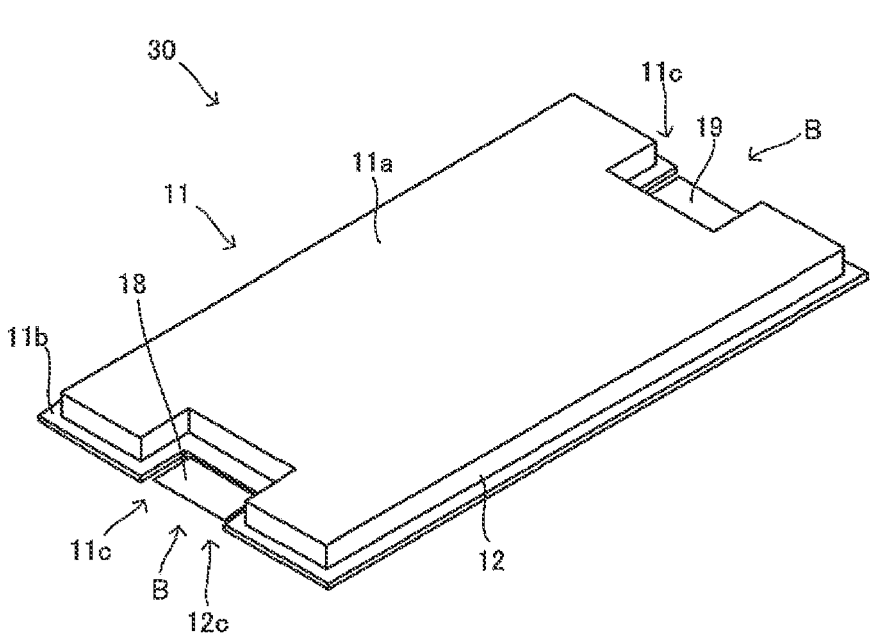
FIG. 6 is an external perspective view of a secondary battery 30.

FIG. 6 is an external perspective view of a secondary battery 30 according to another embodiment. In this embodiment, the secondary battery 30 in the form of a quadrilateral as a whole in a plan view is different from the secondary battery 10 in that the cutout parts B are not provided at corners, but at the respective centers of sides that are opposite to each other. Such a secondary battery also exerts effect as the secondary battery according to the present disclosure.

2. Stack of Secondary Batteries

Figure 7:
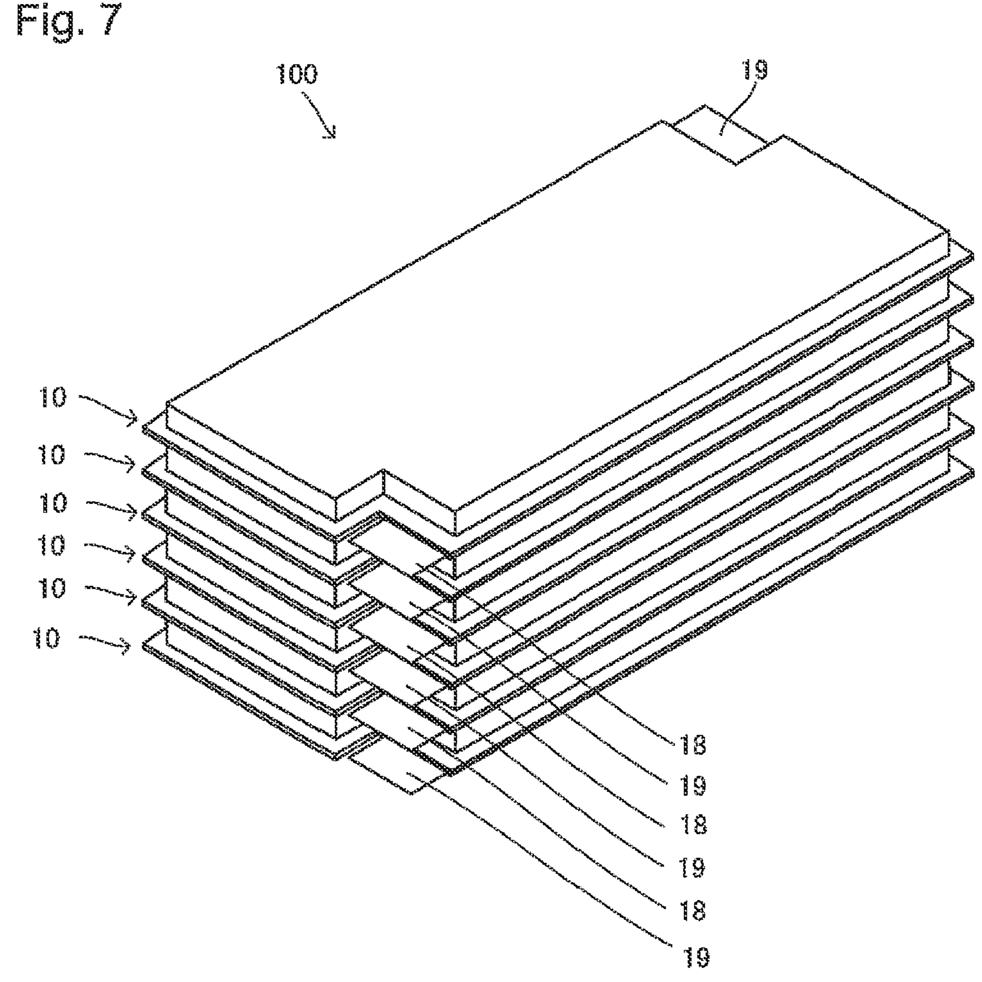
FIG. 7 is an external perspective view of a battery stack 100.

As shown in FIG. 7, a stack of secondary batteries 100 can be obtained by stacking the plural secondary batteries 10 each as unit cells. At this time, as shown in FIG. 7, the secondary batteries can be connected in series by: disposing the secondary batteries 10, so that the electrodes are different from each other between the facing electrode terminals (cathode and anode terminals) of every two secondary batteries 10 that are adjacent to each other in the stacking direction; and connecting the facing terminals to each other.

The secondary batteries can be connected in parallel by: disposing the secondary batteries 10, so that the electrodes of the facing terminals of every two secondary batteries 10 that are adjacent to each other are the same; and connecting the facing terminals to each other.

The secondary battery 30 may be also considered in the same manner.

3. Effect Etc.

Figure 8:
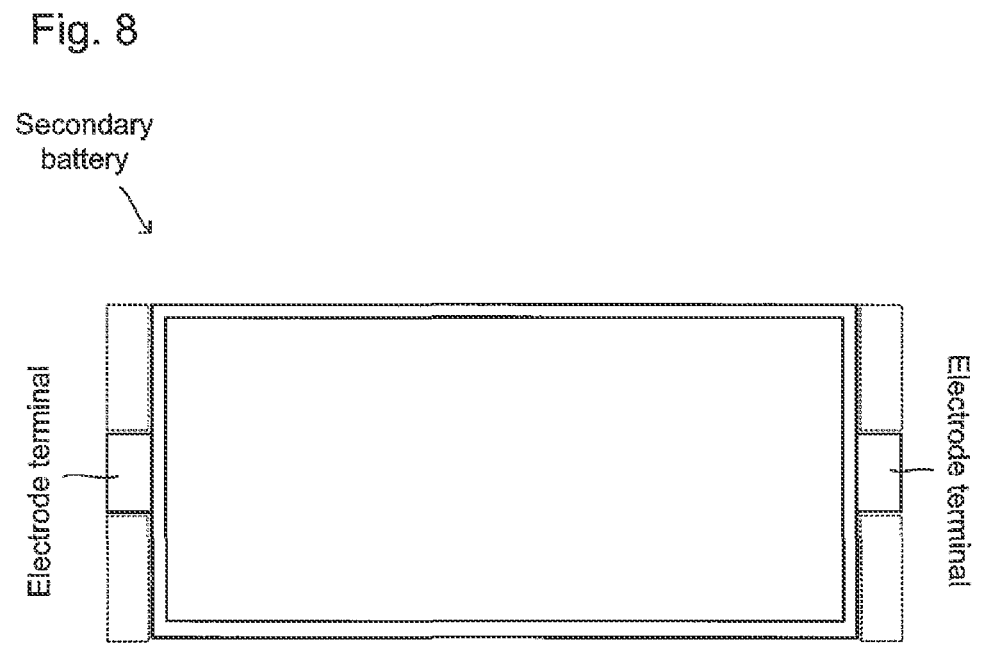

The secondary battery according to the present disclosure can suppress generation of a wasted space because, as well understood from, for example, FIG. 2, all or most of the cathode terminal 18 and the anode terminal 19 can be housed inside the cutout parts B, and thus, the secondary battery has no protruding portions of the terminals only. For example, as a conventional secondary battery shown in FIG. 8, the protruding electrode terminals make it difficult to use the spaces indicated by the dotted lines, and as a result, the spaces adjacent to the electrode terminals are also for the electrode terminals substantially. Accordingly, the shape and size of each of the cutout parts B are not particularly limited, but in some embodiments are made, so that all or most of the cathode terminal and the anode terminal can be housed inside the cutout parts B in a plan view.

In this way, the secondary battery according to the present disclosure can suppress generation of a wasted space, can reduce the proportion of the secondary battery in a device, and can realize an efficient arrangement in structure.

Arranging the two cutout parts at such positions that these cutout parts are symmetrical in a plan view (point-symmetrical with respect to the center of the quadrilateral in the secondary battery 10, and line-symmetrical with respect to a center line of the quadrilateral in the secondary battery 30) can suppress an unstable reaction (deviation) of the electrodes.

In view of the external appearance of a secondary battery, the above effect is exerted even when only exterior bodies are provided with cutout parts corresponding to the cutout parts B but an electrode body is not provided therewith. However, providing the electrode body A to be housed in the exterior bodies with the cutout parts B' corresponding to the cutout parts B as well makes the shapes inside the exterior bodies and the outer shape of the electrode body similar, which can make the proportion of the electrode body in the space inside the exterior bodies larger, can reduce a wasted space, and can make the space efficiently utilized. Therefore, providing the electrode body with the cutout parts B' can further suppress generation of a wasted space in the secondary battery, can reduce the proportion of the secondary battery in a device, and can realize an efficient arrangement in structure.

REFERENCE SIGNS LIST

10 secondary battery
11 exterior body (first exterior body)
12 exterior body (second exterior body)
13 cathode current collector layer
13*a* cathode tab
13*c* cutout part
14 cathode active material layer
14*c* cutout part
15 separator layer (solid electrolyte layer)
15*c* cutout part
16 anode active material layer
16*c* cutout part
17 anode current collector layer
17*c* cutout part
18 cathode terminal
19 anode terminal
20 resin layer

What is claimed is:

1. A secondary battery comprising:

exterior bodies that look a quadrilateral as a whole in a plan view, the exterior bodies each being a sheet member of an exterior material;

an electrode body that is housed in the exterior bodies, the electrode body comprising:

a cathode current collector layer;

a cathode active material layer;

a separator layer;

an anode active material layer; and an anode current collector layer;

cutout parts at respective two sides among sides of the quadrilateral, the two sides being opposite to each other, the two cutout parts being provided at respective corners of the quadrilateral, walls of the exterior bodies extending along sides of the quadrilateral and terminating at the two cutout parts before the respective corners of the quadrilateral, the corners being opposite to each other, the two cutout parts being provided at all the exterior bodies and the electrode body, cross sections of the two cutout parts being perpendicular to the plane direction;

a cathode terminal disposed in one of the cutout parts; and an anode terminal disposed in another one of the cutout parts, wherein the cathode and anode terminals extend in two directions orthogonal to one another and parallel to the electrode body, the cathode and anode terminals extending beyond an outer perimeter of the electrode body in the two directions, and part of the cathode terminal and part of the anode terminal are enclosed within the exterior bodies and extend in a direction parallel to the electrode body.

2. The secondary battery according to claim 1, wherein the electrode body, which is housed in the exterior bodies, is also provided with cutout parts, a resin layer being placed on at least part of each of the cutout parts.

* * * * *